United States Patent
Brooks et al.

(10) Patent No.: US 12,246,761 B2
(45) Date of Patent: Mar. 11, 2025

(54) ADAPTIVE VEHICLE CONTROL SYSTEM

(71) Applicant: Transportation IP Holdings, LLC, Norwalk, CT (US)

(72) Inventors: James D. Brooks, Schenectady, NY (US); Harry Mathews, Jr., Niskayuna, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/522,867

(22) Filed: Nov. 9, 2021

(65) Prior Publication Data

US 2022/0063686 A1    Mar. 3, 2022

Related U.S. Application Data

(63) Continuation-in-part of application No. 16/450,024, filed on Jun. 24, 2019, now Pat. No. 11,203,365.
(Continued)

(51) Int. Cl.
*B61L 15/00* (2006.01)
*B61L 27/04* (2006.01)
(Continued)

(52) U.S. Cl.
CPC ....... *B61L 15/0058* (2024.01); *B61L 15/0018* (2013.01); *B61L 15/0027* (2013.01);
(Continued)

(58) Field of Classification Search
None
See application file for complete search history.

(56) References Cited

U.S. PATENT DOCUMENTS 5,729,619 A    3/1998   Puma
6,822,573 B2   11/2004  Basir et al.
(Continued)

FOREIGN PATENT DOCUMENTS

CN    1784701 A    6/2006
CN    1910593 B    9/2011
(Continued)

OTHER PUBLICATIONS

Eskandarian, Drowsy and Fatigued Driving Problem Significance and Detection Based on Driver Control Functions, Reference work Entry, pp. 941-974, 2012.
(Continued)

*Primary Examiner* — Adam D Tissot
(74) *Attorney, Agent, or Firm* — K&L Gates LLP

(57) ABSTRACT

A vehicle system having processors configured to determine regions of a trip where the vehicle system is permitted for a first mode of control. The permissible regions of the trip are determined based on one or more of parameters of a route, a trend of operating parameters of the vehicle system, or a trip plan that designates one or more operational settings of the vehicle system at different locations, different times, or different distances along a route. The processors also are configured to control transition of the vehicle system between a second mode of control and the second mode of control in the regions by alerting an operator of the vehicle system, automatically switching between the modes of control, or modifying conditions on which the transition occur.

21 Claims, 10 Drawing Sheets

Related U.S. Application Data which is a continuation of application No. 15/482,240, filed on Apr. 7, 2017, now Pat. No. 10,370,012.

(60) Provisional application No. 62/469,142, filed on Mar. 9, 2017.

(51) Int. Cl.
*B61L 27/14* (2022.01)
*G05D 1/00* (2024.01)

(52) U.S. Cl.
CPC .......... *B61L 15/0072* (2013.01); *B61L 27/04* (2013.01); *B61L 27/14* (2022.01); *G05D 1/0005* (2013.01); *G05D 1/0061* (2013.01)

(56) References Cited

U.S. PATENT DOCUMENTS

| | | |
|---|---|---|
| 6,903,658 B2 | 6/2005 | Kane et al. |
| 6,927,694 B1 | 8/2005 | Smith et al. |
| 6,945,966 B2 | 9/2005 | Koenig |
| 8,698,639 B2 | 4/2014 | Fung et al. |
| 8,952,819 B2 | 2/2015 | Nemat-Nasser |
| 9,834,235 B2* | 12/2017 | Melas ................. B61L 15/0072 |
| 10,370,012 B2 | 8/2019 | Brooks et al. |
| 11,203,365 B2 | 12/2021 | Brooks et al. |
| 2005/0024212 A1 | 2/2005 | Hultzsch |
| 2007/0008151 A1 | 1/2007 | Victor et al. |
| 2009/0261979 A1 | 10/2009 | Breed et al. |
| 2010/0222687 A1 | 9/2010 | Thijs et al. |
| 2013/0171590 A1* | 7/2013 | Kumar ..................... G09B 9/06 434/62 |
| 2014/0156133 A1* | 6/2014 | Cullinane .............. B60K 35/00 701/23 |
| 2014/0277878 A1* | 9/2014 | Manickaraj ........... B60W 20/12 180/65.21 |
| 2017/0102700 A1* | 4/2017 | Kozak ................... B60W 30/00 |
| 2018/0203455 A1* | 7/2018 | Cronin ............... B60W 60/0011 |

FOREIGN PATENT DOCUMENTS

| | | |
|---|---|---|
| CN | 102902874 A | 1/2013 |
| CN | 104584084 A | 4/2015 |
| CN | 104732251 A | 6/2015 |
| CN | 104973054 A | 10/2015 |
| DE | 3826943 A1 | 2/1990 |
| GB | 2465439 A | 5/2010 |
| JP | 2008223879 A | 9/2008 |
| KR | 20150007536 A | 1/2015 |
| WO | 2006000166 A1 | 1/2006 |
| WO | 2015066445 A1 | 5/2015 |
| WO | 2015174963 A1 | 11/2015 |
| WO | 2015175435 A1 | 11/2015 |
| WO | 2016044678 A1 | 3/2016 |

OTHER PUBLICATIONS

Shende et al., Driver Fatigue Detection System and the Status Transmission, International Journal of Innovative Research in Science, Engineering and Technology, vol. 4, Issue 6, Jun. 2015.

Sinha et al., Real Time Implementation for Monitoring Drowsiness Condition of a Train Driver using Brain Wave Sensor, International Journal of Computer Applications, vol. 139, Issue 9, Apr. 2016.

Maqbool, Driver Drowsiness Detection—The Technology Race in The Car to Keep the Driver Awake and Focused, http://www.tapedaily.com/technological-race-car-keep-driver-awake-focused/ retrieved on Nov. 2, 2016.

* cited by examiner

ADAPTIVE VEHICLE CONTROL SYSTEM

CROSS-REFERENCE TO RELATED APPLICATIONS

This application is a continuation-in-part of U.S. patent application Ser. No. 16/450,024 (filed 24-Jun.-2019), which is a continuation of U.S. patent application Ser. No. 15/482,240 (filed 7-Apr.-2017, now U.S. Pat. No. 10,370,012), which claims priority to U.S. Provisional Application No. 62/469,142 filed 9-Mar.-2017. The entire disclosures of these applications are incorporated herein by reference.

BACKGROUND

Some existing systems can be used to automatically control movement of vehicle systems during a trip to reduce fuel consumption and/or emission generation relative to manual control of the vehicle systems.

However, increased use of automatic control can lead to a decrease in the skill and the alertness of vehicle operators. Existing systems for addressing operator alertness typically require operators to respond to audio or visual prompts at predetermined intervals to ensure the operators are alert during manual control of the vehicle. Operators who are alert may find the prompts unnecessarily intrusive and obstructive to control of the vehicles. The requirement to repeatedly respond to the prompts, even in light of the operators being aware, can serve as an additional distraction to the same operation of the vehicles. Furthermore, these existing systems do little to nothing to prevent decreasing of operator skills.

DESCRIPTION OF THE DRAWINGS

In the accompanying drawings, which form part of the specification.

Corresponding reference numerals indicate corresponding parts throughout the several figures of the drawings.

BRIEF DESCRIPTION

Figure 1:
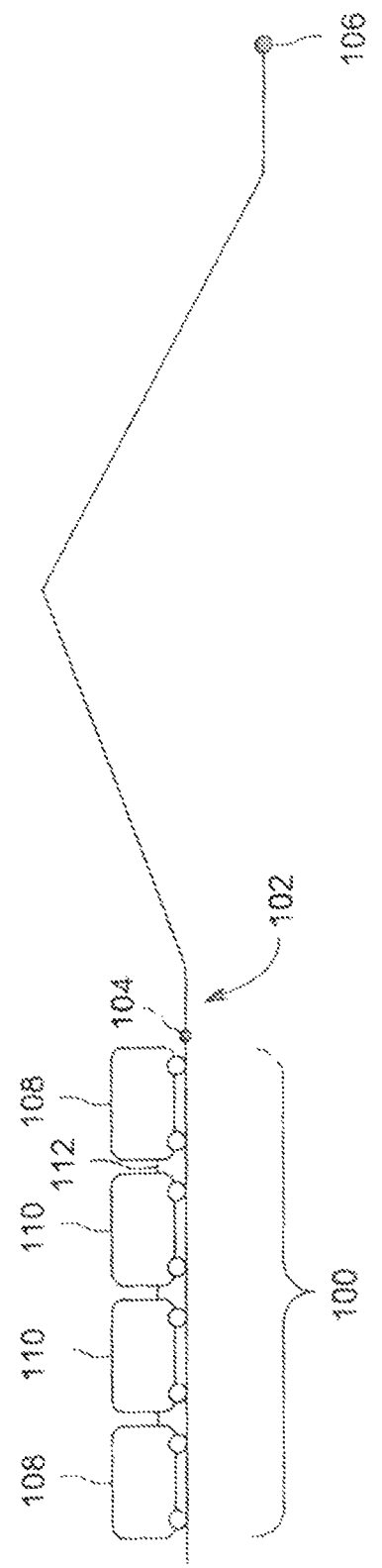
FIG. 1 schematically illustrates a trip of a vehicle system along a route according to one embodiment.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one example, a vehicle control system includes one or more processors that may determine an operating parameter of a vehicle system. The processors may identify one or more regions of a trip of the vehicle system for either a first mode of control or a second mode of control of the vehicle system based on the operating parameter. The processors may automatically switch control of the vehicle system between the first mode of control and the second mode of control based on the operating parameter. The operating parameter may include a grade of a route, a cant of the route, a throttle change of the vehicle system, a difference in fuel efficiencies between automatic control and manual control, an availability of independent distributed power in the vehicle system, an availability of a battery charging station along the route, and/or an environmental or external condition.

In another example, a method includes determining an operating parameter of a vehicle system; identifying one or more regions of a trip of the vehicle system for either a first mode of control or a second mode of control of the vehicle system based on the operating parameter, and automatically switching control of the vehicle system between the first mode of control and the second mode of control based on the operating parameter. The operating parameter may be a grade of a route, a cant of the route, a throttle change of the vehicle system, a difference in fuel efficiencies between automatic control and manual control, an availability of independent distributed power in the vehicle system, an availability of a battery charging station along the route, and/or an environmental or external condition.

In another example, a vehicle control system includes one or more processors that may determine an availability of a battery charging station along a route of a trip of a vehicle system, an environmental condition, and/or an external condition to the vehicle system. The processors may identify one or more permissible regions of a trip of the vehicle system for either a first mode of control or a second mode of control of the vehicle system based on the availability of the battery charging station, the environmental condition, and/or the external condition. The processors may automatically switch control of the vehicle system between the first mode of control and the second mode of control based on the operating parameter. The first mode of control may be automatic control of the vehicle system and the second mode of control may be manual control of the vehicle system. The first mode of control may be local control of the vehicle system and the second mode of control may be remote control of the vehicle system. The first mode of control may be a performance mode of control of the vehicle system and the second mode of control may be an efficiency mode of control of the vehicle system. The environmental condition may be a weather condition, and the external condition may be a presence of a geofenced area along the route indicative of a heavily populated or less populated area.

DETAILED DESCRIPTION

The following detailed description illustrates the inventive subject matter by way of example and not by way of limitation. The description enables one of ordinary skill in the art to make and use the inventive subject matter, describes several embodiments of the inventive subject matter, as well as adaptations, variations, alternatives, and uses of the inventive subject matter. Additionally, it is to be understood that the inventive subject matter is not limited in its application to the details of construction and the arrangements of components set forth in the following description or illustrated in the drawings. The inventive subject matter is capable of other embodiments and of being practiced or being carried out in various ways. Also, it is to be understood that the phraseology and terminology used herein is for the purpose of description and should not be regarded as limiting on all embodiments of the inventive subject matter.

Figure 2:
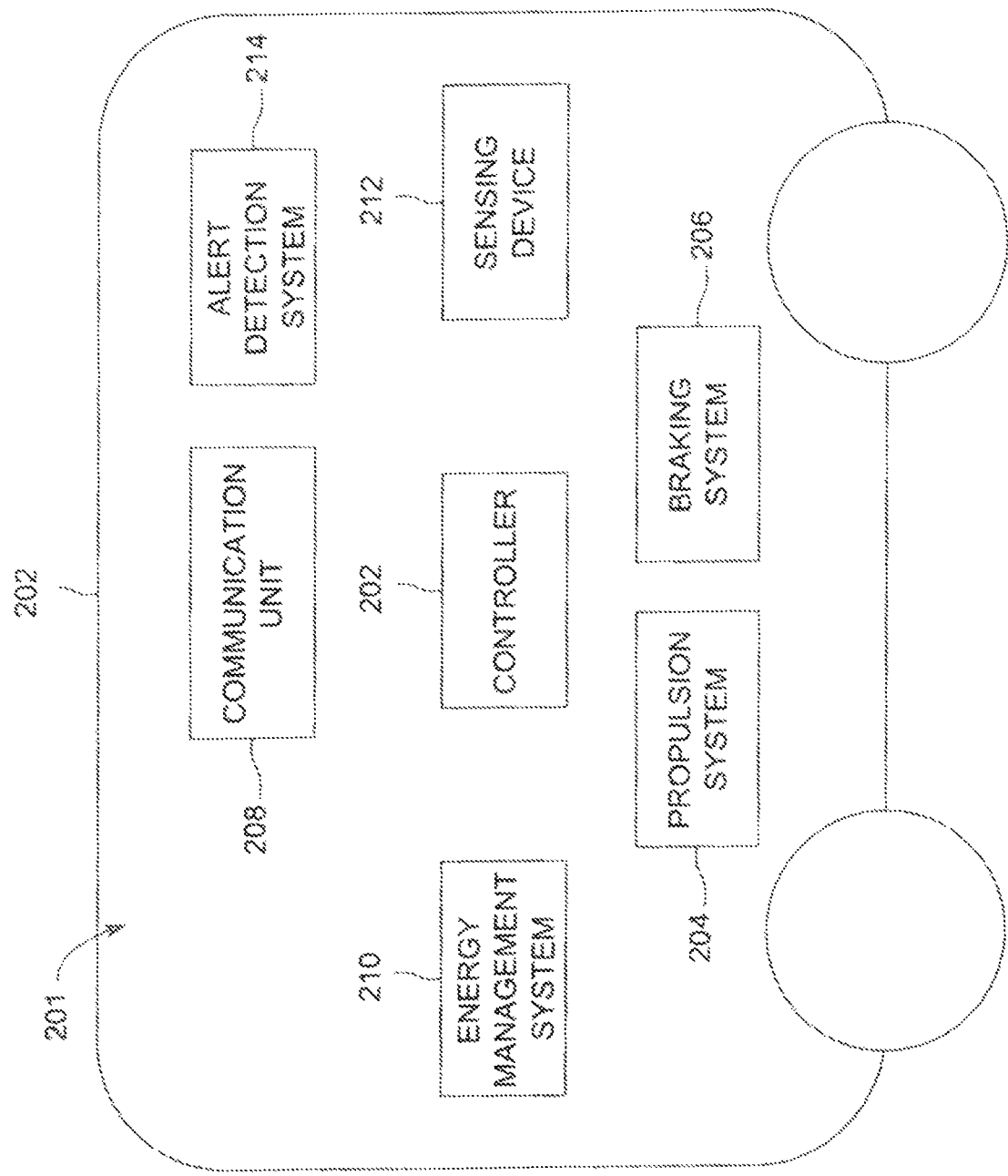
FIG. 2 is a schematic illustration of a vehicle according to one embodiment.

As shown in FIGS. 1-8, an embodiment constructed in accordance with the present disclosure, generally referred to as a vehicle system 100, travels along a route 102 from a first location 104 to a different, second location 106 according to a trip plan determined by or provided to an energy management system 210 (shown in FIG. 2). The trip plan designates one or more operational settings, such as throttle settings, brake settings, speeds, etc., at different locations along one or more routes, different times during the trip, and/or different distances along the one or more routes. For example, the trip plan may set or instruct the vehicle system to move at different speeds at different locations, different throttle or brake settings at different times, or the like. The operational settings of the trip plan are determined by or provided to the energy management system to reduce fuel consumed, emissions generated, noise generated, etc., by the vehicle system relative to the vehicle system traveling along the same routes according to other settings, such as an upper speed limit of the routes, while causing the vehicle system to arrive within a designated amount or range of a scheduled arrival time. A vehicle control system 201 includes an adaptive capability that switches between automatic control and manual control in response to changes in the operating parameters as indicated by the energy management system, or changes in the operator's alertness as indicated by an alertness detection system 214. For example, the vehicle control system can automatically control the throttle setting, brake setting, speeds, etc., of the vehicle system at different locations, times, distances, etc., according to the trip plan during automatic control of the vehicle system. The vehicle control system can direct manual control or changes to the throttle setting, brake setting, speeds, etc., of the vehicle system at different locations, times, distances, etc., according to the trip plan during manual control of the vehicle system.

The alertness detection system monitors how alert one or more operators of the vehicle system are, and optionally provides prompts to the operators requiring responses from the operators to allow the vehicle system to continue moving. The alertness detection system can comprise any arrangement of components and/or methods that provide an indication of an operator's alertness. One exemplary embodiment is a physical and psychophysiological (3P)

model for estimating operator parameters and conditions including fatigue and drowsiness in real-time, which is discussed in detail below and illustrated in FIGS. 5-8. In an alternative embodiment, the alertness detection system can comprise an alerter or alerter device which may require input from the operator at predetermined times or to measure reaction times to indicate an operator's awareness. Alternatively, the operator may be monitored remotely, such as with a video camera, by a supervisor or automated system.

The vehicle system includes one or more propulsion-generating vehicles 108 and optionally may include one or more non-propulsion-generating vehicles 110. The vehicles may be mechanically coupled with each other, such as by couplers 112, such that the vehicles travel together. Optionally, the vehicle system may include propulsion-generating vehicles that are logically connected to each other without being mechanically coupled with each other. For example, the propulsion-generating vehicles may communicate with each other to coordinate the movements of the vehicles with each other such that the vehicles travel together in a platoon. In another example, the vehicles may not be coupled with each other and may not be logically coupled with each other, but may travel together (e.g., as a convoy).

The propulsion-generating vehicles can represent one or more different vehicles that generate tractive effort or power to move the vehicle system along the route. For example, the vehicles can represent automobiles, locomotives, other off-highway vehicles (e.g., vehicles that are not designed and/or not permitted to travel on public roadways), marine vessels, aircraft, trucks, agricultural vehicles, or the like. The non-propulsion-generating vehicles can represent vehicles that do not generate tractive effort or power, or propulsive effort or power. For example, the vehicles can represent railcars, trailers, barges, or the like. Alternatively, the vehicle system may include a single propulsion-generating vehicle.

In operation, the vehicle control system automatically controls movement of the vehicle system according to the trip plan. The vehicle control system examines one or more upcoming segments of the trip to determine where the vehicle control system can switch from automatic control (according to the trip plan or another automated system) to manual control. Because operators may become less alert and/or have skills diminish during prolonged automated control, the vehicle control system determines where to switch from automatic control to manual control to ensure that the operator is alert, remains alert, and/or maintains or improves the skill of the operator. The vehicle control system examines the upcoming segment(s) of the routes and trip plan to determine which first regions or parts of the trip that control of the vehicle system can switch from a first mode of control to a different, second mode of control without consuming additional amounts of fuel, without generating additional amounts of emissions, without posing safety risks, etc., relative to remaining in automated control per the trip plan. As one example, the vehicle control system examines the upcoming segment(s) of the routes and trip plan to determine which permissible regions or parts of the trip that control of the vehicle system can switch from automated control to manual control without consuming additional amounts of fuel, without generating additional amounts of emissions, without posing safety risks, etc., relative to remaining in automated control per the trip plan. The vehicle control system then switches from the first mode of control to the second mode of control at or within these regions and returns to the first mode of control upon leaving these regions (or if the operator is not alert while in a manual control region). With respect to switching to or maintaining automatic control while an operator is not alert, this can increase the safety of the vehicle system and others around the vehicle system in that the vehicle system may present a greater safety risk while being manually controlled by an operator that is not alert when compared with the vehicle system being automatically controlled. The switching between automatic and manual control can maintain the alertness and/or skill of the operator, without consuming a significant amount of excess fuel and/or generating a significant number of excess emissions relative to traveling according to automatic control during those regions where the system switched to manual control.

The vehicle control system can determine which regions of the route are under different modes of control according to various methods or algorithms. For example, the vehicle control system determines the regions as a function of estimated or expected trip plans, a function of route parameters, or a function of trending operating parameters. Route parameters can include, but are not limited to, route gradient or grade, route curvature, route cant, terrain characteristics, or transitions in speed limits. Trending operating parameters can include, but are not limited to, operational settings, operator alertness, fuel efficiency, weather conditions, terrain, notch changes of a throttle of the vehicle system, availability of independent distributed power for the vehicle system, availability of locations to charge energy storage devices onboard the vehicle or vehicle system (e.g., battery charging stations for vehicles), environmental or external conditions, and the like. Based on differences between the estimated or expected trip plans, route parameters, or trending operating parameters, the control system can select some regions of the trip for controlling the vehicle system according to the first mode and can select other, different regions of the trip for controlling the vehicle system according to the second mode.

While one or more examples provided herein focuses on when or where to switch between automatic and manual control of a vehicle system, not all examples of the inventive subject matter are limited or restricted to determining where or when to switch between automatic and manual control. The examples described herein also can be used to determine when or where to switch between other modes of operation or control, such as between a local control mode (where an operator or equipment onboard the vehicle system controls operation of the vehicle system) and a remote control mode (where an operator or equipment off-board the vehicle system controls operation of the vehicle system), a performance mode (where the vehicle system is controlled to increase a work output, such as torque, speed, horsepower, or the like, at the expense or potential expense of increased fuel consumption, energy consumption, or emission generation relative to not increasing the work output) and an efficiency control mode (where the vehicle system is controlled to reduce fuel consumption, energy consumption, or emission generation at the expense or potential expense of reduced work output), or the like. Reference to switching between automatic control and manual control herein equally can apply to switching between or among two or more other modes.

In an exemplary embodiment illustrated in FIGS. 3A-4A, the vehicle control system determines first regions (for control under the first mode) as a function of estimated or expected trip plans. To determine which first regions of the route are under the first mode of control and which regions of the route are under the second mode of control, the vehicle control system compares an automated control trip plan 320 to an estimated or expected manual control trip plan 322. The control system compares these plans to identify permissible regions where variance 328 between operating parameters of the vehicle system in the different plans is reduced relative to the overall route. For example, the control system can compare values the operating parameters of the automatic trip plan with values of the operating parameters of the manual trip plan at the same or similar locations, times, distances, etc., to identify differences between these values. Locations or segments of the route where the differences are smaller than other locations or segments may be identified by the control system as permissible regions, while locations or segments of the route where the differences are larger than other locations or segments may not be identified by the control system as permissible regions. The operating parameters can relate to any relevant aspect of vehicle operation, including, but not limited to, fuel efficiency, time, distance, speed, the number of notch changes, the number of transitions in speed limits, availability of independent distributed power, terrain characteristics. The designation of auto regions 324 and manual regions 326 can be determined prior to travel along the route. Alternatively, the designation of auto regions and manual regions can be determined during travel along the route, based on the alertness of the operator as determined by the alertness detection system, or other parameters.

Figure 3A:
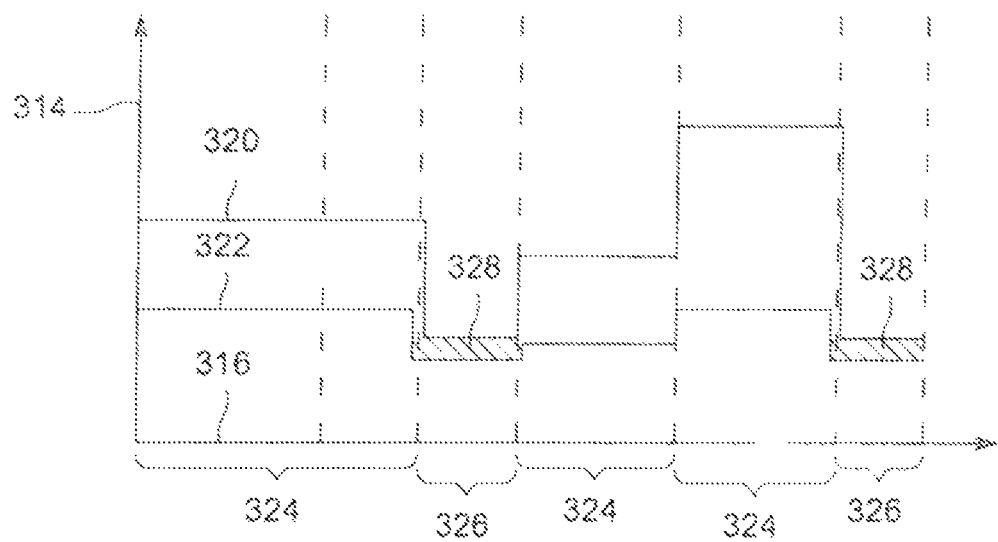
FIG. 3A illustrates a chart comparing the automated control trip plan relative to the manual control trip plan.

FIG. 3A illustrates a fuel efficiency of the vehicle system according to the expected manual control trip plan and the automatic control trip plan according to one example. The vertical axis 314 represents the fuel efficiency of the vehicle system. The horizontal axis 316 represents the distance travelled along the route. Auto regions 324 and manual regions 326 are designated for operation according to either a respective automatic control trip plan or the manual control trip plan.

The exemplary embodiment of FIG. 3A illustrates an expected manual control trip plan 322 determined based on an expected fuel efficiency. Alternatively, the expected manual control trip plan can determined according to other parameters. For example, the manual control trip plan can be based on parameters including, but not limited to, trip planning data, a model of driver behavior, or historic data from previous operation of the vehicle system, operation settings, fuel efficiency, weather conditions, terrain characteristics the number of notch changes, the number of transitions in speed limits, or availability of independent distributed power, parameters. Using such factors, the vehicle control system can determine an estimated one or more parameters, for the route for designation as the expected manual control trip plan. This is reflected in the example illustrated in FIG. 3A as the expected manual control trip plan based on fuel efficiency.

The automated trip plan designates operational settings of the vehicle system as a function of time and/or distance along the route. These operational settings can include speeds, accelerations, throttle positions, brake settings (e.g., brake pressures), or the like. Traveling according to the automated trip plan can cause the vehicle system to reduce the amount of fuel consumed and/or emissions generated by the vehicle system relative to the vehicle system traveling according to other, different operational settings.

Figure 3B:
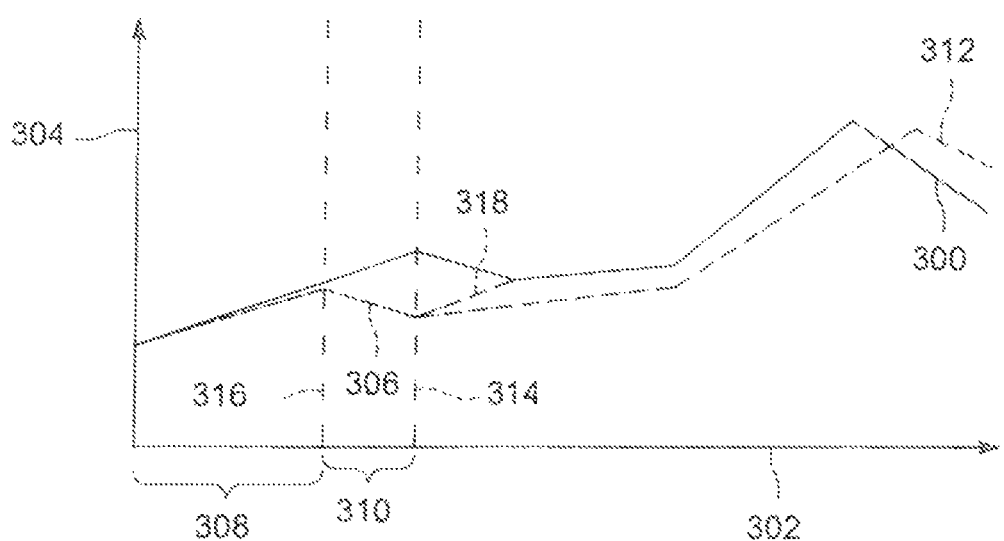
FIG. 3B illustrates operational settings designated by a trip plan for the vehicle system shown in FIG. 1 according to one example.

FIG. 3B illustrates operational settings 300 designated by an automatic control trip plan 324 for the vehicle system according to one example. The designated operational settings are shown alongside a horizontal axis 302 representative of time elapsed during the trip and/or distance along the route (shown in FIG. 1) during the trip. The designated operational settings also are shown alongside a vertical axis 304 representative of different operational settings.

Actual operating parameters or conditions 306 of the vehicle system also are shown in FIG. 3B. The designated operational settings and the actual operating conditions may represent similar operations of the vehicle system. For example, the designated operational settings can represent designated speeds of an automatic control trip plan 320 while the actual operating conditions represent actual speeds of the vehicle system. As another example, the designated operational settings can represent designated accelerations of an automatic control trip plan 324 while the actual operating conditions represent actual accelerations of the vehicle system.

During a first time period or distance range 308 of the automatic control trip plan, the actual operating conditions of the vehicle system are the same as or approximately the same as the designated operational settings of the automatic control trip plan. For example, the actual operating conditions may be within a designated threshold range of the designated operational settings of the automatic control trip plan. Subsequent to the first time period or distance range, the actual operating conditions begin to deviate from the designated operational settings of the automatic control trip plan by increasing amounts during a second time period or distance range 310.

The actual operational conditions may be compared to the designated operational settings in order to identify differences there between. For example, during the time period or distance range, these differences may be relatively small. During the subsequent time period or distance range, however, the differences increase and may become relatively large.

During travel according to the trip plan, the vehicle control system may be unable to exactly follow the operational settings designated for the auto regions and/or the manual regions due to change in the operator's alertness For example, if the alertness detection system detects a decrease in the operator's alertness below a designated level or threshold, the trip plan may prohibit or delay a switch between the automated control trip plan and the manual control trip plan. Operation of the alertness detection system is described further below.

In another example, the vehicle control system determines the permissible regions and/or the automatic regions as a function of locations for charging energy storage devices onboard the vehicle or vehicle system. For example, the vehicle or vehicle system may be an electric vehicle or a hybrid vehicle having a propulsion system (e.g., motors) that are entirely or partially powered by propel the vehicle or vehicle system using electric energy stored in the energy storage devices onboard the vehicle or vehicle system. The vehicle control system may examine locations along the routes to be traveled upon to determine whether there are any charging stations. If there are available charging stations and the vehicle or vehicle system is likely to need to at least partially charge one or more energy storage devices to complete a trip, then the vehicle control system may identify the portions of the route having the charging stations as manual control regions (or may not identify these portions as permissible regions. This can ensure that an operator is manually controlling movement of the vehicle or vehicle system near the charging stations, which may be crowded and/or have more objects nearby (and an increased risk of colliding with those objects if under automatic control).

In another example of environmental conditions and/or external conditions, the vehicle control system determines the permissible regions and/or the automatic regions as a function of environmental conditions and/or external conditions. For example, the vehicle or vehicle system may determine which regions are automatic regions based on where certain weather conditions exist or do not exist. Portions of the route within areas experiencing poor or adverse weather (e.g., high winds, ice or rain, dust storms, etc.) may be identified as permissible regions while other areas are identified as automatic regions. The vehicle or vehicle system may determine which regions are automatic regions based on conditions of the route in different locations. The portions of the routes having routes in poor conditions (e.g., pitted or broken rails, many potholes, low or missing ballast, etc.) may be identified as permissible regions while other areas are identified as automatic regions.

In another example of environmental conditions and/or external conditions, the vehicle control system determines the permissible regions and/or the automatic regions as a function of traffic density. The vehicle or vehicle system may determine which regions are automatic regions based on where traffic density (e.g., the number of vehicles per unit area or distance along a route) does not exceed a designated threshold and can identify the permissive regions based on where the traffic density exceeds the threshold. This can ensure that the operator remains in control of the vehicle or vehicle system in heavy traffic areas. Alternatively, the vehicle or vehicle system may identify the automatic regions as those areas where traffic density is greater so that the automatic control can reduce the likelihood of collisions relative to manual control.

In another example of environmental conditions and/or external conditions, the vehicle control system determines the permissible regions and/or the automatic regions as a function of vehicle loading. Vehicle loading can be whether the vehicle or vehicle system is carrying cargo, the amount (e.g., size and/or weight) of cargo being carried, the type of cargo being carried (e.g., hazardous materials versus persons), etc. The vehicle or vehicle system may determine more regions are automatic regions when less cargo is being carried, the cargo being carried is not hazardous and/or is not people, etc. Conversely, the vehicle or vehicle system may determine other regions are permissible regions when more cargo is being carried, the cargo being carried is hazardous and/or is people, etc. Alternatively, the automatic regions may be selected for areas where the vehicle or vehicle system is carrying more cargo, is carrying hazardous cargo or people, etc., and permissible regions are selected for other areas where cargo is not carried and/or the cargo that is carried is not hazardous or people.

In another example of environmental conditions and/or external conditions, the vehicle control system determines the permissible regions and/or the automatic regions as a function of location. For example, the vehicle or vehicle system may identify portions of routes in less populated areas (e.g., rural areas where the population density is no more than a designated threshold) as automatic regions and portions of routes in more heavily populated areas (e.g., urban or suburban areas where the population density exceeds the threshold) as permissible regions. This can provide for the operator manually controlling the vehicle or vehicle system in areas where there is decreased risk to other persons due to the reduced population densities. The different areas can be identified based on geofences. For example, regions of a route within one geofence may be permissible regions while regions of the route within another geofence may be automatic regions.

In another example, the vehicle control system determines the permissible regions and/or the automatic regions as a function of throttle changes. For example, the vehicle or vehicle system may be traveling according to the trip plan and the number of throttle changes required for the vehicle or vehicle system to move according to the trip plan may be counted or otherwise identified. The control system may select portions or segments of the trip where the number of throttle changes (e.g., or rate at which throttle changes occur) is no greater than a designated threshold as automatic regions and select other portions (where the number or rate of throttle changes exceeds the threshold) as the manual regions. This can improve handling of the vehicle or vehicle system as the manual control of the vehicle system or vehicle in the areas requiring more frequent throttle changes can be more gentle or less jarring than automatic control.

Figure 4A:
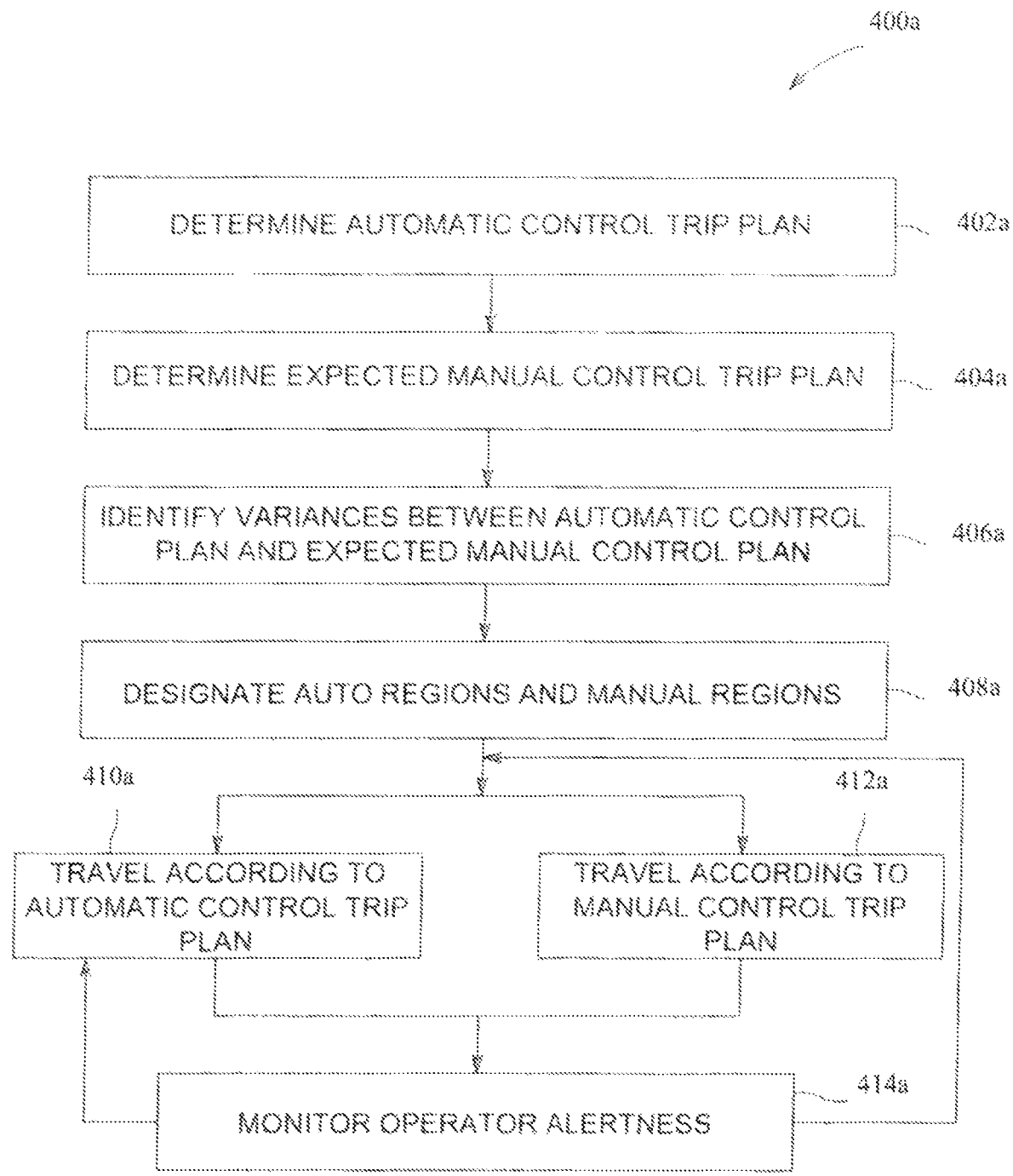
FIG. 4A illustrates a flowchart of a method for determining a trip plan of a vehicle system according to one embodiment.

FIG. 4A illustrates a flowchart of a method 400a for determining a trip plan of a vehicle system 100 according to one embodiment. The method 400a may be practiced by an energy management system and/or controller disposed onboard the vehicle system and/or disposed off-board the vehicle system. At step 402a, an automatic control trip is determined. At step 404a an expected manual control trip is determined. The trip plans can be determined at an off-board location, such as a dispatch facility, another vehicle system, an off-board operator control unit (e.g., a handheld remote control), or the like. Optionally, the trip plans may be created and/or determined onboard the vehicle system. The trip plans may be created by an energy management system or obtained from a computer readable memory (e.g., a hard drive, flash drive, or the like) that stores previously created trip plans.

At step 406a, variances between the automatic control trip plan and the expected manual control plan are determined. At step 408a, regions along the route are designated as either auto regions or manual regions according to the variances identified in step 406a.

In regions designated for the automatic control trip plan, at step 410 the vehicle system travels by following the automatic control trip plan. In regions designated for the manual control trip plan, the vehicle system travels by following the manual control trip plan at step 412a.

At step 414a, the alertness of the operator is monitored by the alertness detection system as the vehicle system travels along the route. For example, if the detection system determines that the alertness of the operator has reduced below a predetermined threshold, the vehicle control system can prohibit from following the manual control trip plan at step 412a, and maintain following the automatic control trip plan at step 410a. Alternatively, if the detection system determines that the alertness of the operator has above a predetermined threshold, the vehicle control system will follow either the automatic control trip plan at step 410a or the manual control plan at step 412a according to the auto region or manual region as designated at step 408a.

Figure 4B:
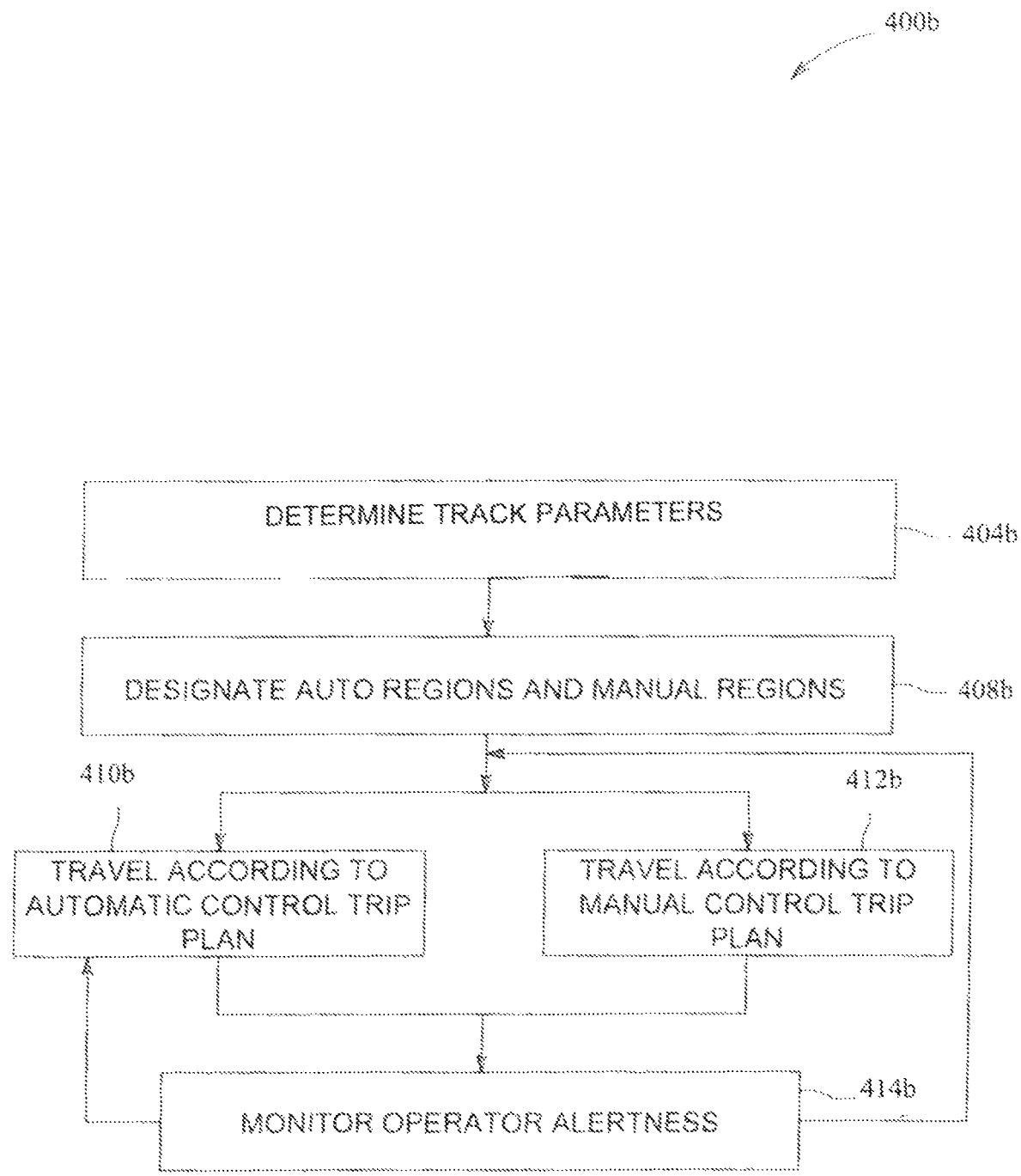
FIG. 4B illustrates a flowchart of a method of determining a trip plan of a vehicle system according to an alternate embodiment.

FIG. 4B illustrates a flowchart of a method 400b for determining a trip plan of a vehicle system as a function of route parameters. The method 400b may be practiced by an energy management system and/or controller disposed onboard the vehicle system and/or disposed off-board the vehicle system. At step 404b, route parameters along the route are determined. The route parameters can be determined at an off-board location, such as a dispatch facility, another vehicle system, an off-board operator control unit (e.g., a handheld remote control), or the like. Optionally, the track parameters may be determined onboard the vehicle system. The route parameters may be determined by an energy management system or obtained from a computer readable memory (e.g., a hard drive, flash drive, or the like) that stores previously created trip plans.

At step 408b, regions along the route are designated as either auto regions or manual regions according to the operating conditions determined in step 404b. In regions designated as auto regions, the vehicle system travels by following the automatic control trip plan at step 410b. In regions designated as manual regions, the vehicle system travels by following the manual control trip plan at step 412b.

At step 414b, the alertness of the operator is monitored by the alertness detection system as the vehicle system travels along the route. For example, if the detection system determines that the alertness of the operator is below a predetermined threshold, the vehicle control system can be prohibited from following the manual control trip plan at step 412b, and maintain following the automatic control trip plan at step 410b. Alternatively, if the detection system determines that the alertness of the operator is above a predetermined threshold, the vehicle control system will follow either the automatic control trip plan at step 410b or the manual control plan at step 412b according to the auto region or manual region as designated at step 408b.

Figure 4C:
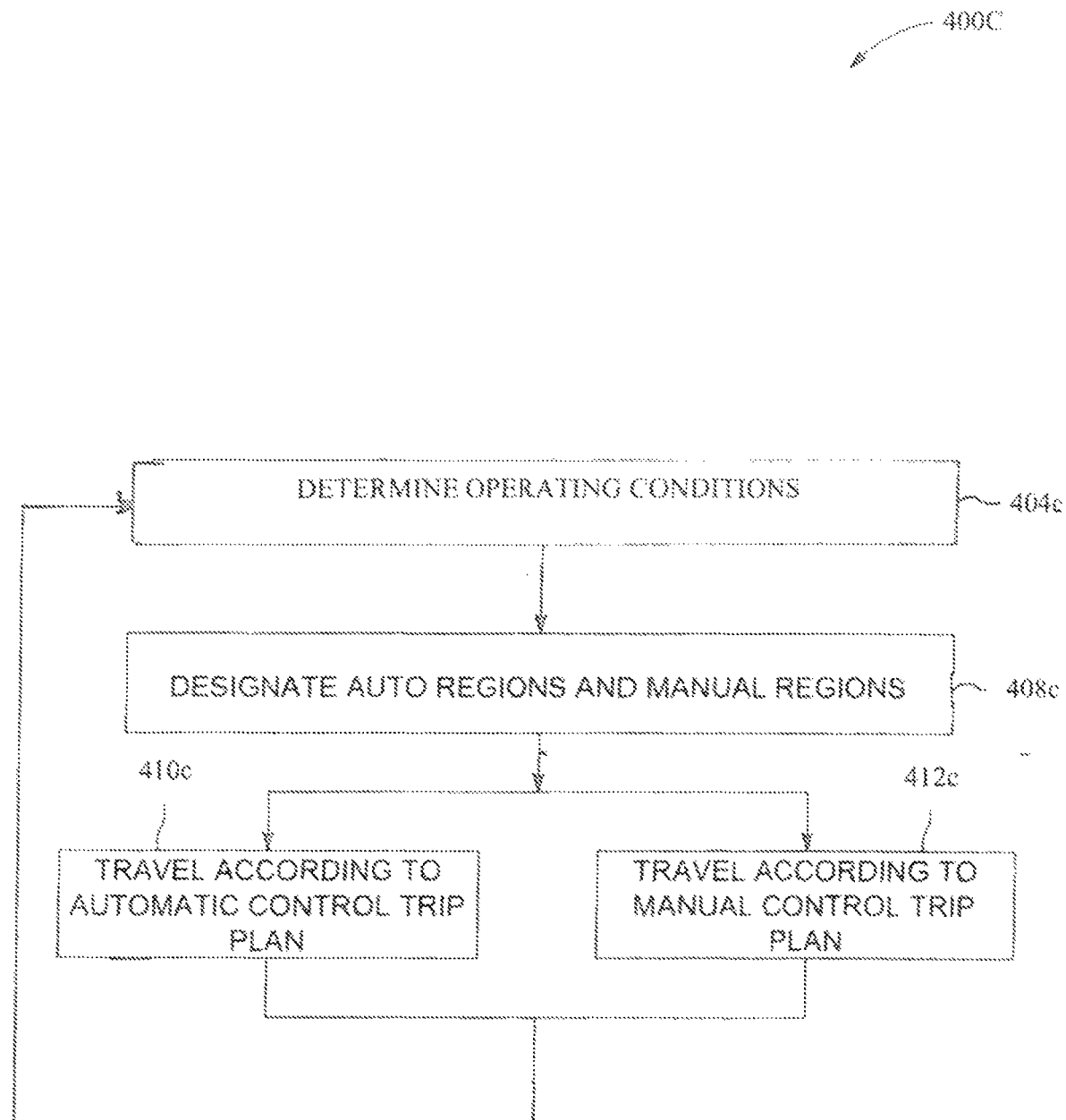
FIG. 4C illustrates a flowchart of a method of determining a trip plan of a vehicle system according to an alternate embodiment.

FIG. 4C illustrates a flowchart of a method 400c for determining a trip plan of a vehicle system as a function of operating conditions or parameters. The method 400c may be practiced by an energy management system and/or controller disposed onboard the vehicle system and/or disposed off-board the vehicle system. At step 404c operating conditions along the route are determined. The operating conditions can be determined at an off-board location, such as a dispatch facility, another vehicle system, an off-board operator control unit (e.g., a handheld remote control), or the like. Optionally, the operating conditions may be determined onboard the vehicle system. The operating conditions may be determined by an energy management system or obtained from a computer readable memory (e.g., a hard drive, flash drive, or the like) that stores previously created trip plans.

At step 408c, regions along the route are designated as either auto regions or manual regions according to the operating conditions determined in step 404c. In regions designated as auto regions, the vehicle system travels by following the automatic control trip plan at step 410c. In regions designated as manual regions, the vehicle system travels by following the manual control trip plan at step 412c. Subsequently, the operating conditions are determined again at step 404c. In this way, the operating conditions are continuously monitored and determined during travel along the route. The operating conditions may include operator alertness. In addition, the operating conditions may also include a percentage of the route already traveled under manual control. For example, if travel along the route reaches a predetermined threshold of travel under manual control, such as 20%, the remainder of the route can be de designated as an auto region.

FIG. 2 is a schematic illustration of a vehicle 200 according to one embodiment. The vehicle may represent one or more of the vehicles shown in FIG. 1. For example, the components shown in FIG. 2 as being onboard the vehicle may be disposed onboard two or more different vehicles of the vehicle system shown in FIG. 1.

A controller 202 of the vehicle includes or represents hardware circuits or circuitry that include and/or are connected with one or more computer processors, such as one or more computer microprocessors. The controller can control operations of the vehicle and/or vehicle system, such as by autonomously controlling a propulsion system 204 and/or a braking system 206 of the vehicle according to an automatic control trip plan or revised automatic control trip plan, and/or by receiving input from an operator to manually control the propulsion system and/or the braking system according to the manual control trip plan. For example, the controller may represent or include one or more input devices, such as a throttle, pedal, touchscreen, electronic mouse, stylus, microphone, or the like, to receive commands from an operator to control operations of the vehicle.

The propulsion system represents one or more components that work to generate tractive effort or power. For example, the propulsion system can represent one or more motors, engines, or the like, that propel the vehicle. The braking system represents one or more components that work to slow or stop movement of the vehicle, such as airbrakes, friction brakes, or the like.

A communication unit 208 of the vehicle represents hardware circuits or circuitry that include and/or are connected with one or more computer processors (e.g., microprocessors) and communication devices (e.g., wireless antenna and/or wired connections) that operate as transmitters and/or transceivers for communicating signals with one or more locations disposed off-board the vehicle. For example, the communication unit may wirelessly communicate signals with a facility and/or another vehicle system, or the like. The communication unit may receive trip plans or revised trip plans from off-board locations and/or may communicate trip plans or revised trip plans to off-board locations.

An energy management system 210 of the vehicle includes or represents hardware circuits or circuitry that include and/or are connected with one or more computer processors, such as one or more computer microprocessors. The energy management system creates and/or revises the operational settings designated by trip plans to form and/or revise the trip plans. One example of an energy management system includes the Trip Optimizer™ system of the General Electric Company, but alternatively may be another type of energy management system.

The energy management system can create and/or revise the automatic control trip plan based on trip planning data, such as trip data, vehicle data, and/or route data. Trip data includes information about an upcoming trip by the vehicle or vehicle system. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the vehicle system in various locations, slow orders, and the like). Vehicle data includes information about the vehicle, vehicle system, and/or cargo being carried by the vehicle and/or vehicle system. For example, vehicle data may represent cargo content (such as information representative of cargo being transported by the vehicle) and/or vehicle information (such as model numbers, manufacturers, horsepower, and the like, of the vehicle). Route data includes information about the route upon which the vehicle or vehicle system travels. For example, the route data may include information about locations of damaged sections of a route, locations of route sections that are under repair or construction, the curvature and/or grade of a route, and the like. The route data is related to operations of the vehicle as the route data includes information about the route that the vehicle is or will be traveling on. However, other types of data can be recorded as the data and/or the data may be used for other operations. The automatic control trip plans optionally may be referred to as trip profiles or speed profiles, and can be formed in accordance with one or more embodiments described in U.S. patent application Ser. No. 13/545,271, the entire disclosure of which is incorporated herein by reference.

A sensing device 212 of the vehicle represents one or more components that determine (e.g., measure, sense, calculate, estimate, model, or otherwise obtain) the operating conditions of the vehicle and/or vehicle system that includes the vehicle. For example, the sensing device can include one or more sensors, such as tachometers, accelerometers, coupler force sensors, global positioning system receivers, air pressure sensors, sensors that detect throttle positions, or the like. These sensors can measure operating conditions of the vehicle system and generate data representative of the operating conditions. Optionally, the sensing device can include hardware circuits or circuitry that include and/or are connected with one or more computer processors (e.g., microprocessors) that may determine the actual operating conditions of the vehicle and/or vehicle system based on a mathematical or physics-based model of the vehicle and/or vehicle system. For example, based on relative speeds, locations, and/or accelerations of different vehicles in the vehicle system, a spring model, lumped mass model, or other type of model may be used to calculate or estimate the operating conditions of the vehicle system (e.g., coupler forces, slack in the couplers, or the like). As another example, based on measured air pressures in the brake system of the vehicle or another brake system of the vehicle system, a hydraulic model of the brake system(s) can be used to calculate or estimate air pressures and/or air flows in one or more locations of the brake system(s) as the operating conditions of the vehicle or vehicle system.

This data can be communicated from the sensing device to the controller and/or energy management system. The controller can use this data as feedback to determine how to control the vehicle and/or vehicle system in order to follow the automatic control trip plan. The energy management system can use this data to determine when to revise the automatic control trip plan and/or to determine the initial operational settings designated by the revised automatic control trip plan, as described herein.

Figure 5:
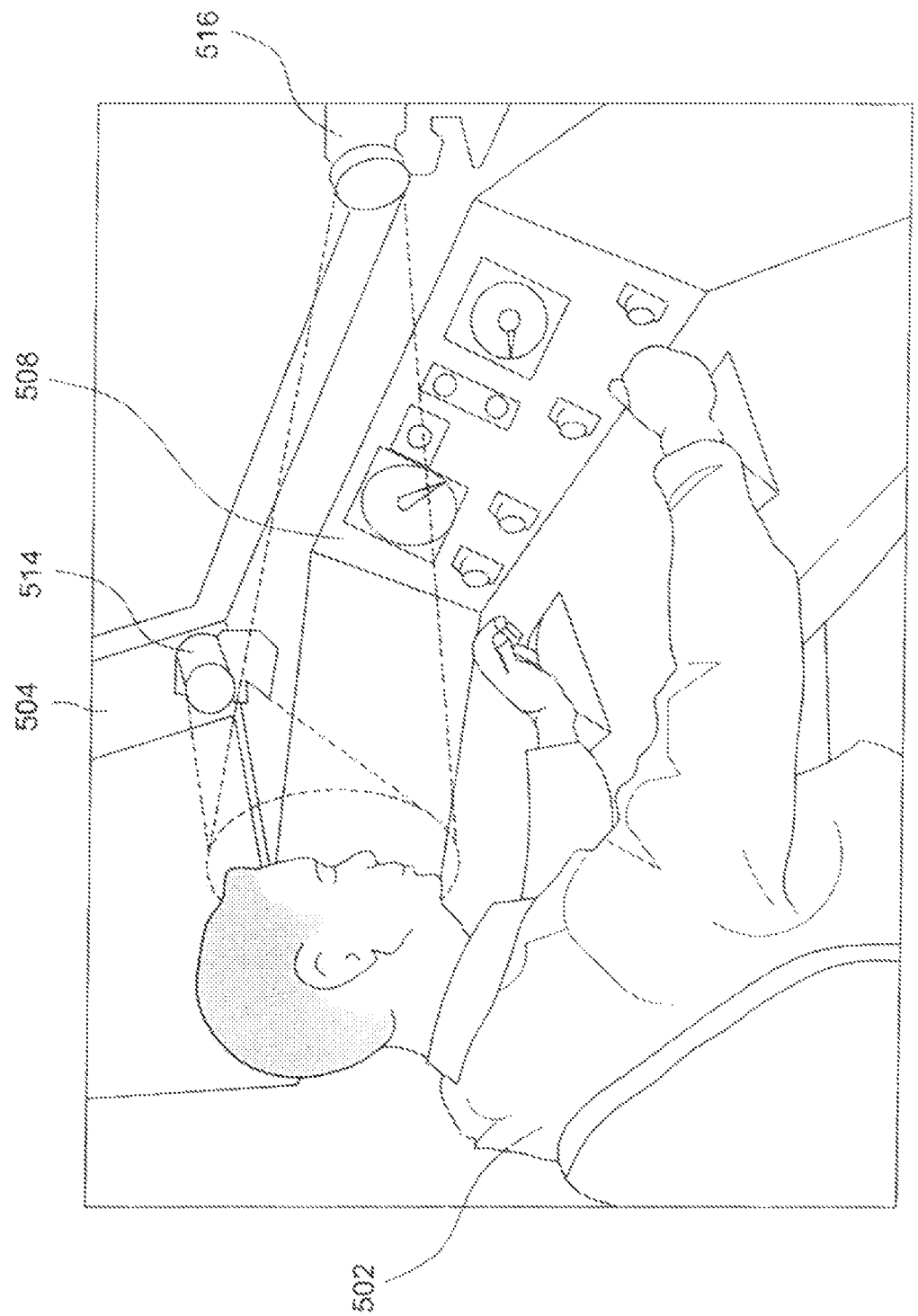
FIG. 5 is a schematic diagram of an alertness detection system for monitoring an operator within a vehicle in accordance with one embodiment.

The alertness detection system of the vehicle has one or more processors that may provide a fully contactless imaging system and a physical and psychophysiological (3P) model for estimating operator parameters and conditions including fatigue and drowsiness in real-time. As illustrated in FIG. 5, the imaging system includes a first imaging device that typically is an RGB (Red Blue Green) digital camera, that can be a RGBD (Red, Green, Blue, Depth) camera, and a second imaging device that typically is a thermal camera that both provide data to the one or more processors for creating a physically and psychophysiologically output of the operator in real-time. The one or more processors utilize the data from the RGB camera and thermal camera to passively measure bio-signals emanated, including an operator's face during night or day while the operator is on the job, without asking the operator to indicate vigilance periodically. Thus, alertness detection system is usable during the day or night without additional illuminators depending on imaging device types inside the operator's cabin or surrounding environment, or electrodes affixed to the skin. As a result, this allows for long monitoring functions unobtrusively inside the vehicle.

The first imaging device, while described as a RGB camera, may be of any type, including but not limited to a reflected near infrared (NIR) camera or a shortwave infrared (SWIR) camera. The RGB, NIR and SWIR cameras may be instrumented with suitable illuminators. Similarly, the second imaging device, while described as a thermal camera may of any type, including but not limited to a midwave infrared (MWIR) or a longwave infrared (LWIR) camera which is capable of collecting emitted waves. Other imaging devices of interest suitable for this kind of alerter is ultrawide band microwave imaging technology. Depth measuring imaging devices such as Kinect, Multi and hyperspectral cameras in the visible and infrared wavelength range are other imaging devices suitable for use in the alerter technology. Any combinations of these imaging devices may be used to extract 3P information about the operator intervention.

Historical data related to 3P parameters of the operator in the form of a 3P model is generated through experimentation to be used by the alertness detection system. A 3P model is a relationship between features (or indicators) from non-contact sensor data to cognitive indicators derived from body-worn sensor(s) data responsible for fatigue and alertness. During experiments, an imaging system provides data related to visible physical characteristics (i.e., physical indicators) of the operator. These include, but are not limited to, sagging posture, leaning of head, head nods, gaze direction, expressions, eye-ball motions, pose, gestures, blinking, yawning, and the like.

During experiments, psychophysiological indicators such as pulse rate, respiration rate, heart rate variability, peak-to-peak pulse locations, power in harmonics, knowledge-based/shallow/deep learning features are generated from blood flow data coming from below the skin and can be measured using imaging devices as well as with body-worn devices well-known to the medical community, including: electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals.

During experiments conducted offline in a controlled setting, data from body-worn devices is used not only to validate the measurements from non-contact imaging-based systems, but also are used to extract well-known psychological indicators such as fatigue and drowsiness from EEG signals. Physical characteristics (i.e., physical indicators) are largely associated with the above surface indicators, and can be obtained with imaging devices such as RGB and/thermal imaging device. Combining a subset of both measurements in one device has the potential to provide very accurate results.

While these experiments are occurring the corresponding 3P changes detected by the imaging devices are compared to the psychological parameters that are measured and collected in the form of fatigue and drowsiness. Mathematical modeling is then utilized to construct a 3P model that associates the images and data from images generated by one or more imaging systems (e.g., features) to the corresponding psychological effects experienced by an operator. Health effects of the operator are obtained from measurements such as pulse rate, respiration rate, peak-to-peak pulse locations, and the like. The alertness detection system utilized on the vehicle is then able to detect 3P changes of an operator using a 3P model based on the images which is developed from human experiments in a controlled laboratory setting. These 3P changes are monitored in real-time without requiring intervention by the operator.

For example, the 3P changes of the operator may be monitored without requiring the operator to actuate a button or switch, provide an answer to a query or test, keep weight on a kill switch, or the like. Because images from the imaging devices contain health parameters, they are also monitored over time. In this manner health parameters as well as psychological parameters, fatigue and drowsiness, are measured unobtrusively and without operator intervention over time or at regular intervals or as and when required while operating the train. In particular, the alertness detection system takes data generated and utilizes an algorithm or look up tables to determine the health parameters of the operator. In this manner, the alertness detection system is a contactless and a passive monitoring system with abilities to record 3P data of the operator inside the cabin at all times without additional illumination depending on the type of imaging device used.

The alertness detection system allows predictive capabilities to be incorporated to provide early warning of impending danger to a vehicle such as a locomotive as a result of operator error. Additional performance hindering behavioral states such as texting, operational compliance functions, and situational awareness external to the cabin is recognized from image analytics and combined with 3P quantities to provide more advanced capabilities. In addition, the alertness detection system can be used to perform postmortem analysis in the event of accidents.

The alertness detection system is unobtrusive and based on physiological cues rather than only behaviors as indicated by physical characteristics, and uses task-relevant knowledge of expected behaviors and workload. The alertness detection system measures psychological data that includes data related to fatigue and drowsiness and other operator based parameters with advanced capabilities. For example, with highly sensitive thermal imagery of the operator's face, one can extract additional information associated with psychophysiology (e.g., emotion, joy, arousal etc.) by monitoring thermal changes in regions such as nose, cheeks, periorbital/supraorbital regions, forehead, maxillary, neck-carotid, lips/mouth and the like.

Figure 6:
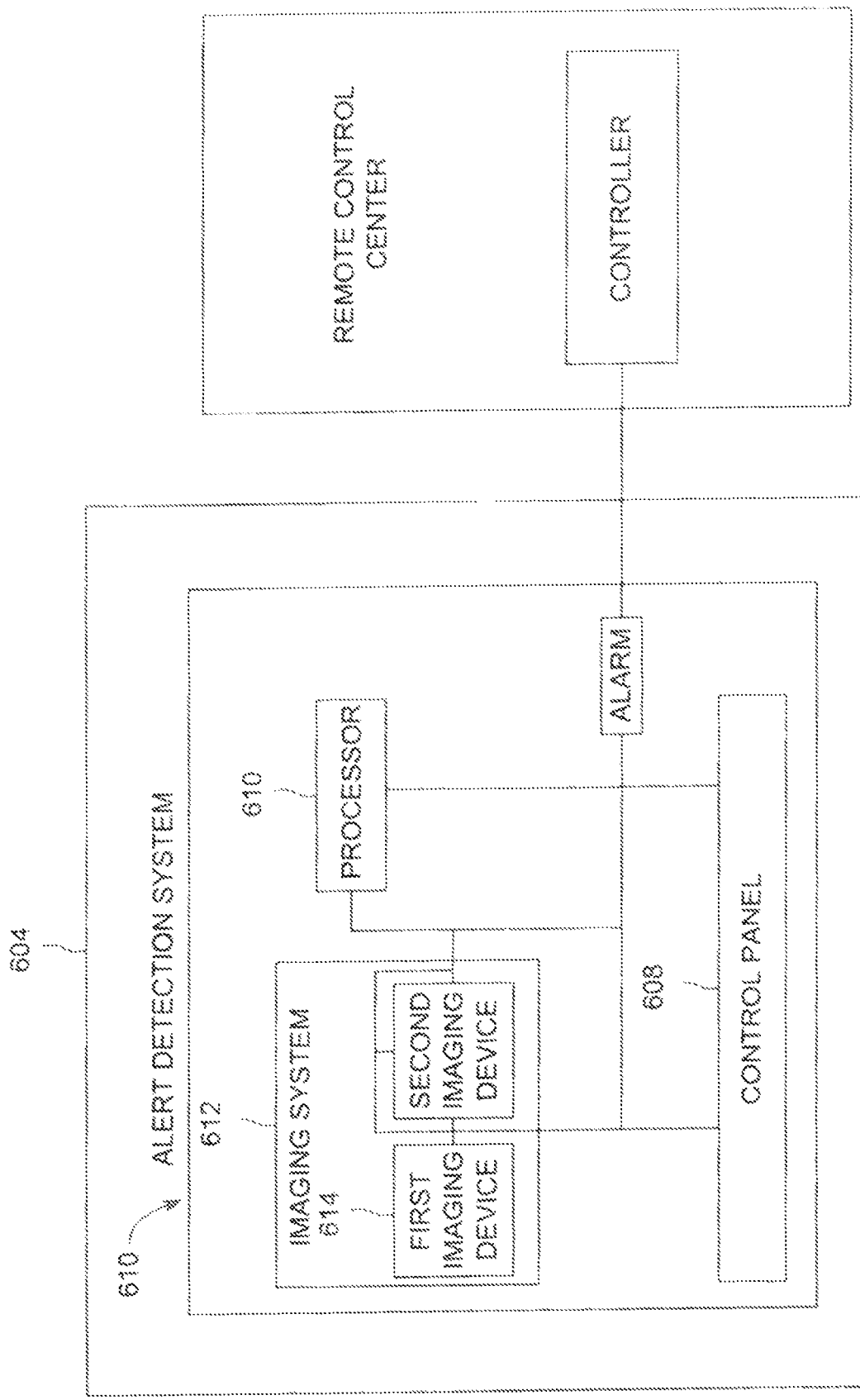
FIG. 6 is a schematic diagram of the alertness detection system of FIG. 5.

FIGS. 5 and 6 are schematic diagrams showing features of one embodiment of the alertness detection system for monitoring an operator 502 of a vehicle. The vehicle has a controller 608 used by the operator for controlling the vehicle based on inputs of the operator. This controller can represent hardware circuitry that includes and/or is connected with one or more processors (e.g., one or more microprocessors, field programmable gate arrays, and/or integrated circuits) that generate control signals that are communicated to propulsion systems, brake systems, and/or output devices to control movement and other operations of the vehicle. The alertness detection system also includes one or more processors 610 that may store, receive and transmit data, including but not limited to 3P model, historical data and real-time data. The alertness detection system may make calculations utilizing algorithms and store look up tables therein to generate 3P outputs related to the operator.

An imaging system 612 is also part of the alertness detection system and is in communication with the one or more processors to provide real-time data related to the operator to the one or more processors. The imaging system in one embodiment includes a first imaging device 614 that is a RGB camera and continually records digital images of the operator. The first imaging device generates pixel based data in real-time that is continuously communicated to the one or more processors. In this embodiment, a second imaging device 616 is also provided that is a thermal camera. Specifically, the thermal camera generates thermal based data related to the operator in real-time that is also continuously communicated to the one or more processors.

As both reflective and IR images contain information above and below the skin surface, based on the feature extraction one or more processors use a 3P model to obtain operator health parameters such as heart rate, respiration rate, fatigue and drowsiness levels and operator based physical indicators. The psychophysiological features obtained from blood volume waveform extracted from imaging devices such as RGB device are: blood oxygen saturation, tidal respiration rate, a Poincare Plot of peak-to-peak pulse dynamics, a pulse harmonic strength, power in harmonics of cardiac frequencies, heart rate variability, pulse rate, pulse amplitude, statistical features and key salient transition points on the waveform. The alertness detection system thus uses the RGB and additionally thermal imaging system to extract various physical cues/features such as specific micro-expression associated with nuanced muscle movement, macroexpressions, eye closure (blink-rates), head nodding, and yawning. Motion signatures are obtained by computing space-time corners or interest points. The physical and psychophysiological features from the imaging system computed in one of the processors are then used in the 3P model to determine fatigue and drowsiness levels. While some of the psychophysiological features have health information, in this manner the operator is monitored for both 3P as well as health conditions for determining attentiveness of the operator at controlling the vehicle.

The RGB and thermal image of a subject face are taken simultaneously with the co-located imaging devices of the imaging system. Then, a pre-computed transformation (a homography) is used to warp the thermal image onto the RGB image. This results in a new joint image where each pixel has R, G, B, and T values. The production of such imagery allows subsequent algorithms to make determination related to alerting the operator and operating the vehicle.

Image alignment is then achieved via forward and back projection. For example, given a stream of RGBT images, facial landmarks such as the corners of the eyes and mouth as well as the contour of the face is automatically fitted to each image. This allows for a warping of the RGBT image into a canonical frontal view. In this manner the imagery is normalized. Therefore, pixels from different normalized images are assumed to be in correspondence.

In addition to the analysis of images in isolation, temporal features such as optical flow are incorporated directly into the image representation. In addition, a Bayesian framework is constructed by considering the probability of observing a given facial cue that have been observed during prior observations within the historical data. In particular, full facial regions are taxonomized from thermal images into action units and subcutaneous temperature of the action units are extracted as thermal features. Other historical data such as physical anthropometric data and age are also utilized in determining operator health parameters and modeling.

In another embodiment, the alertness detection system is in communication with a remote alertness detection system that can be at a control center and operated or monitored by a third party. Upon receiving communication from the alertness detection system of a potential health and/or alertness condition of an operator, the third party can contact the operator directly or monitor the vehicle remotely to ensure proper operation of the vehicle. The alertness detection system either automatically or through remote actuation also controls the vehicle to brake the vehicle and stop the vehicle based upon the health related conditions of the operator monitored by the imaging system. The alertness detection system may also provide prompts to the operator such as math questions or otherwise to attempt to gather additional health information regarding the operator through requested operator inputs before braking or stopping the vehicle. Similarly, the alertness detection system can increase cognitive action through requested cognitive inputs such as solving simple problems to prevent sleepiness, drowsiness and fatigue prior to stopping the vehicle. Alternatively, the alerting system can make recommendations for the operator of the vehicle again to prevent sleepiness, drowsiness and fatigue, to combat cognitive and health related conditions, or to ensure the attentiveness of the operator.

Thus, the alertness detection system utilizes the parameters provided in historical data, including a 3P model such that when the imaging system is monitoring an operator in real-time, the information received by the imaging system is used to compute physical and psychophysiological features. Once the features are computed, a 3P model is executed in real-time to determine whether an operator is fatigued, sleepy, sleeping, stressed, under duress, incapacitated, distracted or the like. Responsive to the real-time results from 3P features and output of 3P model, the alertness detection system can alert the operator, remote third party or both with an alarm or can operate the vehicle through braking or stopping the vehicle depending upon the 3P and/or health conditions monitored by the alertness detection system.

Figure 7:
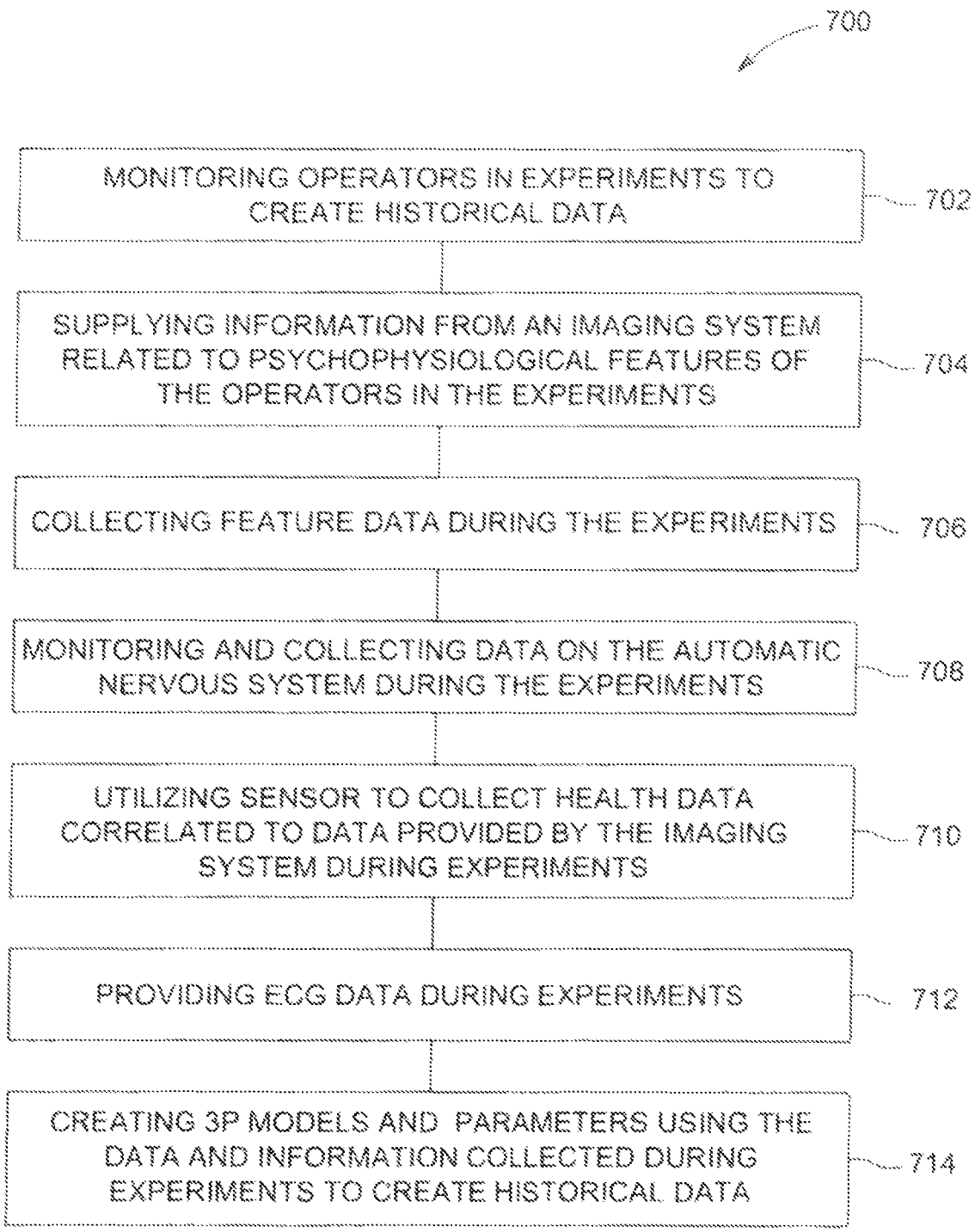
FIG. 7 illustrates a flow chart of a method of forming historical data for an alertness detection system.

FIG. 7 illustrates a flowchart of one embodiment of a method 700 of forming historical data and a 3P model to be used by the alertness detection system for monitoring the operator. At step 702, in experiments, operators operating a vehicle are placed under a similar stressed environment in a controlled setting (e.g., a locomotive simulator) and are monitored with both an imaging system and physical body-worn sensors, including but not limited to electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals. The sensors can be passive or non-passive, and measurements are taken simultaneously with the images from the imaging system, including, but not limited to thermal images and digital images of the operator. To obtain a 3P model from the experimental data, the data is converted to meaningful features that correlate to physical and psychophysiological features. These features are used in a data driven parameterized mathematical model to estimate fatigue and drowsiness scores among other parameters to provide historical data for the alertness detection system. A well-known feature engineering methodology is incorporated to extract well-correlated features from the imaging devices to psychological indicators such as power spectrum in delta, theta, alpha, beta, and gamma bands, which indicates fatigue and drowsiness.

At step 704, psychophysiological features extracted from contactless sensors are also supplied by the imaging system during the experiments used to create the historical data. Both reflective and IR video images contain information above and below the skin surface, and their spatial relations are useful for detecting psychophysiological features. In general terms, psychophysiological features that can be obtained from blood volume (BV) waveform, includes, but is not limited to tidal respiration rate, peak-to-peak dynamic periods, a pulse harmonic strength, power in harmonics of cardiac frequencies, heart rate variability (HRV), pulse rate, pulse amplitudes, statistical features, key salient transition points on the waveform, and the like.

At step 706, during the experiments to create the historical data for the alertness detection system, the feature data collection, additional knowledge-based, shallow, and deep learning features are similarly collected and engineered. For example, a blood volume (BV) pulse signal is obtained from facial RGB videos. This is accomplished either by using model-based removal of signals due to specular mirror-like reflections from the skin surface or by post-processing using multi-band physiologic filters. The respiration rate is obtained from videos using one of three approaches; facial videos from blood volume waveform, measurement of motion-induced respiration, and nasal air flow with thermal images.

The HRV quantifies fluctuations in the interval between heartbeats, attributed to the continuous changes in the vago (parasympathetic)-sympathetic balance. In this manner the autonomic nervous system (ANS) is extracted from sensors at step 308. The ANS regulates functions of internal organs and is one of the psychophysiological features used as historical data for obtaining the 3P models used by the alertness detection system. As an example of how monitoring the interval between heartbeats can be used to monitor an operator, if the monitored sympathetic tone is more dominant, it increases the heart rate, puts the body in "fight-or-flight response," a physiological reaction that occurs in the presence of something that is stressful, terrifying—either mentally or physically. Alternatively, and in opposite, increased parasympathetic stimulation lowers the heart rate, resulting in low energy and a desire to be at rest. Therefore, an indicator of feeling tired and drowsy as is the case after a meal is presented. While, HRV has historically been obtained from ECG and contact PPG signals; an operator or individual is monitored to provide historical data such that the RGB and T data is utilized to determine such fluctuations. Alternatively, HRV statistics can be extracted from BV waveform, again based on data collected from an imaging system. Thus, many methods can be used to utilize the imaging system to provide historical data for modeling related to the health of the operator.

Alternatively, historical data for the alertness detection system is created by utilizing sensors, such as the contact-PPG, which provides a much cleaner BV waveform, pulse rate, respiration rate, and HRV that are correlated to those obtained from the imaging device outputs at step 710. At step 712, ECG data is also used to provide data for modelling and is used to confirm PPG measurements. Similarly, EEG recordings show changes correlated with cognition (fatigue and drowsiness). A frequency spectrum of EEG signals is typically divided into five groups: delta signals (<4 Hz) being the slowest waves are usually correlated with sleep; theta signals (4-7 Hz) are associated with drowsiness; alpha waves (7-15 Hz) are related to relaxation; beta waves (15-30 Hz) are mostly related to active thinking and a high-level of alertness; gamma signals (>30 Hz) are related to perception of external stimuli such as sound and images with a high cognition level. Thus, power spectrum in delta, theta, alpha, beta, and gamma bands act as good indicators of psychophysiological activities (i.e., ground truth) for developing the model for estimating state-of-mind using features extracted from the imaging system while operating the train.

Once features are engineered, a subset of, well-correlated features from the imaging system are compared to psychological indicators to construct an input-output model to be used as historical data at step 714. The vector of 3P features is fit to a plurality of models. The 3P model is an input/output (I/O) model which receives a vector of physical and physiological features and generates, as output, psychological quantities. The 3P model is comprised of a plurality of fitting functions, and may be developed with basic functions, which are aggregated to obtain outputs. Parameters of the model are fitted to a training data set using conventional least squares or sparse optimization methods.

Figure 8:
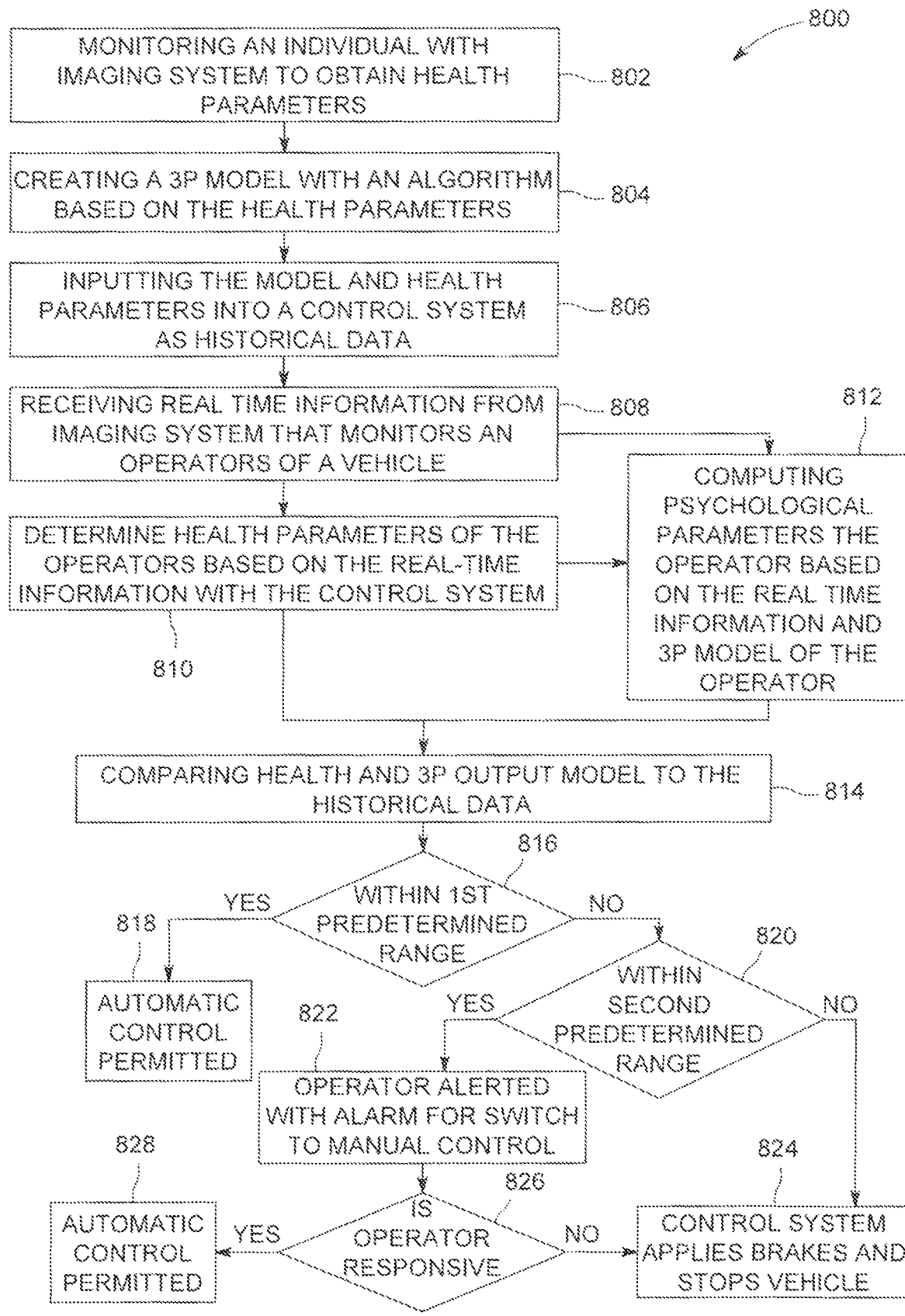
FIG. 8 illustrates a flow chart of a method for monitoring an operator of a vehicle.

FIG. 8 shows a method 800 for alerting an operator. At step 802, an individual is monitored by an imaging system and sensors during conditions similar to operating a vehicle to obtain physical, physiological and psychological parameters under predetermined stress conditions. The imaging system can include a first imaging device that is a RGB digital camera and a second imaging device that is a thermal camera. Other imaging devices described above can also be used during the creation & use of 3P model. At step 804, the physical, and psychological parameters are utilized with an algorithm to form a 3P model of an operator. At step 806, the model and health based parameters are inputted into an alertness detection system of a vehicle as historical data.

At step 808, the alertness detection system receives real-time information from an imaging system that monitors an operator of the vehicle. The imaging system can include a first imaging device that is a RGB digital camera and a second imaging device that is a thermal camera. In other embodiments, other imaging devices are utilized as discussed above. At step 810, the alert detection system determines physical, physiological and psychological features or parameters from the real-time information received from the imaging system. Optionally, at step 812, the alert detection system uses these features to compute health and psychological (fatigue and drowsiness) conditions from 3P model of the operator based upon the real-time information received from the imaging system or from the physical, physiological and psychological parameters determined by the alertness detection system.

At step 814, the real-time 3P model output and health parameters, are used to compare the health and psychological condition of the operator to the inputted historical data. At step 816, if during the comparison at step 814 the output parameters of 3P model fall within a first pre-determined range, then no alert is provided at step 818 and automatic control is permitted. At step 820, if during the comparison at step 814 the parameters or output of 3P model do not fall within the first pre-determined range, a decision is made whether they fall within a second pre-determined range that indicate an operator health related issue and is presented to the alertness detection system which then alerts the operator by actuating an alarm at step 822 and switching or transferring back to manual control by the operator if the system was in an automatic control mode. Examples of such operator health related issues that would cause a parameter or the output of 3P model to fall with the second pre-determined ranges includes, but is not limited to, head nodding indicating fatigue or drowsiness, head or eye movement away from the front of the vehicle indicating distracted driving, increased heart rate, irregular beats as in atrial fibrillation or breathing indicating potential sickness or emergency condition, or the like.

At step 820, if the parameters or output of 3P model do not fall within the second pre-determined range that indicates a serious operator health related issue and the control system brakes or stops the vehicle at step 824. Examples of such operator health related issues include extreme increase in heart rate, irregular heartbeats, stoppage of breathing, extreme fluctuations in facial temperature, delayed cognitive responses or other indication that the operator is incapacitated, intoxicated or experiencing a severe health condition. Similarly, if the alarm is actuated at step 822 the operator must take manual control of the vehicle system at decision point 826. If the operator's health and psychological parameters improve (i.e. they fall within the $1^{st}$ predetermined range), the system allows automatic control at step 828. If the operator is not responsive the alert detection system brakes or stops the vehicle again at step 824.

As an example of how the method of FIG. 8 works, after the physical, physiological and psychological parameters under predetermined stress conditions in a controlled environment are obtained and/or the operator model determined, the imaging system continuously monitors the operator of a vehicle using real-time data. In this example a RGB digital camera provides information that the operator starts to blink their eyes significantly more often than compared to the physical, physiological and psychological parameters provided for in the historical data and/computed from the 3P model using real-time data. The imaging system also provides that the operator's eyelids remain closed longer than a typical blink also within the historical data. As a result of these conditions or parameters, the alertness detection system actuates its alarm to alert the driver that he is becoming fatigued, and the energy management system initiates a transition to manual control. A message is also communicated remotely to an operations center to alert a third party that the driver is fatigued.

As yet another example, both physical and psychophysiological features from the imaging devices are extracted from real-time data and used as input to the multivariate 3P model to generate the output such as the psychological state of the operator (e.g., fatigue and drowsiness levels). If the fatigue and drowsiness levels exceed the predetermined limit as indicated in the historical data, then the alertness detection system actuates its alarm to alert the driver that he is becoming fatigued, and the energy management system initiates a transition to manual control.

As another example, a thermal camera of the imaging system detects that the face of the operator becomes flushed, indicating an increased heart rate. Based on the sudden increase of heat of the operator the alert detection system alerts a remote operations center that the operator is experiencing an increased psychophysiological state (e.g., heart rate or heart rate variability). An individual at the remote operations center then contacts the operator to check their status while the alarm is actuated by the alertness detection system and the vehicle operator is requested to provide input into the alert detection system. When the vehicle operator is unresponsive and unable to provide input, the alert detection system switches control of the vehicle to the automatic control trip plan or stops the vehicle.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one example, a vehicle control system includes one or more processors that may determine an operating parameter of a vehicle system. The processors may identify one or more regions of a trip of the vehicle system for either a first mode of control or a second mode of control of the vehicle system based on the operating parameter. The processors may automatically switch control of the vehicle system between the first mode of control and the second mode of control based on the operating parameter. The operating parameter may include a grade of a route, a cant of the route, a throttle change of the vehicle system, a difference in fuel efficiencies between automatic control and manual control, an availability of independent distributed power in the vehicle system, an availability of a battery charging station along the route, and/or an environmental or external condition.

The environmental or external condition may be a weather condition and/or a geofenced area along the route indicative of a heavily populated or less populated area. The first mode of control may be automatic control of the vehicle system and the second mode of control may be manual control of the vehicle system. The first mode of control may be local control of the vehicle system and the second mode of control may be remote control of the vehicle system. The first mode of control may be a performance mode of control of the vehicle system and the second mode of control may be an efficiency mode of control of the vehicle system.

In another example, a method includes determining an operating parameter of a vehicle system; identifying one or more regions of a trip of the vehicle system for either a first mode of control or a second mode of control of the vehicle system based on the operating parameter, and automatically switching control of the vehicle system between the first mode of control and the second mode of control based on the operating parameter. The operating parameter may be a grade of a route, a cant of the route, a throttle change of the vehicle system, a difference in fuel efficiencies between automatic control and manual control, an availability of independent distributed power in the vehicle system, an availability of a battery charging station along the route, and/or an environmental or external condition. The environmental or external condition may be a geofenced area along the route indicative of a heavily populated or less populated area.

In another example, a vehicle control system includes one or more processors that may determine an availability of a battery charging station along a route of a trip of a vehicle system, an environmental condition, and/or an external condition to the vehicle system. The processors may identify one or more permissible regions of a trip of the vehicle system for either a first mode of control or a second mode of control of the vehicle system based on the availability of the battery charging station, the environmental condition, and/or the external condition. The processors may automatically switch control of the vehicle system between the first mode of control and the second mode of control based on the operating parameter. The first mode of control may be automatic control of the vehicle system and the second mode of control may be manual control of the vehicle system. The first mode of control may be local control of the vehicle system and the second mode of control may be remote control of the vehicle system. The first mode of control may be a performance mode of control of the vehicle system and the second mode of control may be an efficiency mode of control of the vehicle system. The environmental condition may be a weather condition, and the external condition may be a presence of a geofenced area along the route indicative of a heavily populated or less populated area.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc.) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

Changes can be made in the above constructions without departing from the scope of the disclosure, it is intended that all matter contained in the above description or shown in the accompanying drawings shall be interpreted as illustrative and not in a limiting sense.

What is claimed is:

1. A vehicle control system comprising:
   one or more processors configured to determine one or more operating parameters of a vehicle system that is moving according to a trip plan that designates throttle settings of the vehicle system at different locations, different times, or different distances along one or more routes, the one or more processors configured to identify one or more regions of a trip of the vehicle system for either a manual mode of control or autonomous mode of control of the vehicle system according to the trip plan based on the one or more operating parameters, the one or more processors configured to automatically switch control of the vehicle system between the manual mode of control and the autonomous mode of control based on the one or more operating parameters,
   wherein the one or more operating parameters comprises one or more of a counted number of occurrences of a throttle change required by the trip plan for the vehicle system, or a rate of the counted number of occurrences of the throttle change required by the trip plan for the vehicle system.

2. The vehicle control system of claim 1, wherein the one or more operating parameters also comprises a grade of the one or more routes.

3. The vehicle control system of claim 1, wherein the one or more operating parameters also comprises a cant of the one or more routes.

4. The vehicle control system of claim 1, wherein the one or more operating parameters comprises the counted number of occurrences of the throttle change that is designated by the trip plan or the rate of the counted number of occurrences of the throttle change of the vehicle system that is designated by the trip plan, the one or more processors configured to control switching of the vehicle system to the autonomous mode responsive to the counted number or the rate of the counted number being no greater than a second designated threshold, the one or more processors configured to control switching of the vehicle system to the manual mode responsive to the counted number or the rate of the counted number being greater than the second designated threshold.

5. The vehicle control system of claim 1, wherein the one or more operating parameters also comprises a difference in fuel efficiencies between the autonomous mode of control and the manual mode of control.

6. The vehicle control system of claim 1, wherein the one or more operating parameters also comprises an availability of a battery charging station along the one or more routes.

7. The vehicle control system of claim 1, wherein the one or more processors are configured to automatically switch control of the vehicle system from the autonomous mode of control to the manual mode of control responsive to a traffic density exceeding a second designated threshold.

8. The vehicle control system of claim 7, wherein the one or more operating parameters further comprises a geofenced area along the one or more routes indicative of the geofenced area having a population density that exceeds a first designated threshold.

9. A method comprising:
determining an operating parameter of a vehicle system;
identifying one or more regions of a trip plan of the vehicle system for either a manual mode of control or an autonomous mode of control of the vehicle system based on the operating parameter, the trip plan designating throttle settings of the vehicle system at different locations, different times, or different distances along one or more routes; and
automatically switching control of the vehicle system between the manual mode of control and the autonomous mode of control according to the trip plan based on the operating parameter,
wherein the operating parameter comprises a counted number of occurrences of a throttle change required by the trip plan for the vehicle system, or a rate of the counted number of occurrences of the throttle change required by the trip plan for the vehicle system.

10. The method of claim 9, wherein the operating parameter also comprises a grade of the one or more routes.

11. The method of claim 9, wherein the operating parameter also comprises a cant of the one or more routes.

12. The method of claim 9, further comprising automatically switching the control of the vehicle system to the autonomous mode responsive to the counted number or the rate of the counted number being no greater than a second designated threshold, and
automatically switching the control of the vehicle system to the manual mode responsive to the counted number or the rate of the counted number being greater than the second designated threshold.

13. The method of claim 9, wherein the operating parameter also comprises a difference in fuel efficiencies between the vehicle system operating under the autonomous mode of control and the vehicle system operating under the manual mode of control.

14. The method of claim 9, wherein the operating parameter also comprises an availability of a battery charging station along the one or more routes, and
the method further comprises automatically switching control of the vehicle system from the autonomous mode of control to the manual mode of control responsive to the battery charging station being available along the one or more routes.

15. The method of claim 9, wherein the operating parameter also comprises a traffic density, and
the method further comprises automatically switching control of the vehicle system from the autonomous mode of control to the manual mode of control responsive to the traffic density exceeding a first designated threshold.

16. The method of claim 15, wherein operating parameter also comprises a weather condition.

17. The method of claim 15, wherein the operating parameter is a geofenced area along the one or more routes indicative of the geofenced area having a population density that exceeds a second designated threshold.

18. A vehicle control system, comprising:
one or more processors configured to count a number of throttle changes, a rate of the counted number of throttle changes, or both the counted number and the rate of the counted number of throttle changes that are required for a vehicle to move according to a trip plan that designates operational settings of the vehicle for one or more of different locations, different times, or different distances along one or more routes, the one or more processors configured to automatically switch operation of the vehicle between different modes based on the counted number of the throttle changes, the rate of the counted number of throttle changes, or both the counted number and the rate of the counted number of throttle changes.

19. The vehicle control system of claim 18, wherein the one or more processors are configured to automatically switch operation of the vehicle between the different modes that comprise an automatic control mode of the vehicle and a manual control mode of the vehicle.

20. The vehicle control system of claim 18, wherein the one or more processors are configured to automatically switch operation of the vehicle between the different modes that comprise a local control mode of the vehicle and a remote control mode of the vehicle.

21. The vehicle control system of claim 18, wherein the one or more processors are configured to automatically switch operation of the vehicle between the different modes that comprise a performance mode of control of the vehicle and an efficiency mode of control of the vehicle.

* * * * *